(12) United States Patent
Ratia et al.

(10) Patent No.: US 11,155,439 B2
(45) Date of Patent: Oct. 26, 2021

(54) ELEVATOR ENERGY SOLUTION

(71) Applicant: Kone Corporation, Helsinki (FI)

(72) Inventors: Jouni Ratia, Helsinki (FI); Markku Haivala, Helsinki (FI); Seppo Suur-Askola, Helsinki (FI)

(73) Assignee: Kone Corporation, Helsinki (FI)

( * ) Notice: Subject to any disclaimer, the term of this patent is extended or adjusted under 35 U.S.C. 154(b) by 847 days.

(21) Appl. No.: 15/970,129

(22) Filed: May 3, 2018

(65) Prior Publication Data
US 2018/0251338 A1 Sep. 6, 2018

Related U.S. Application Data

(63) Continuation of application No. PCT/FI2015/050767, filed on Nov. 6, 2015.

(51) Int. Cl.
| | |
|---|---|
| *B66B 5/02* | (2006.01) |
| *H02J 7/14* | (2006.01) |
| *H02J 7/02* | (2016.01) |
| *B66B 1/30* | (2006.01) |
| *B66B 11/04* | (2006.01) |

(52) U.S. Cl.
CPC ............. *B66B 5/027* (2013.01); *B66B 1/308* (2013.01); *B66B 5/024* (2013.01); *B66B 11/043* (2013.01); *H02J 7/02* (2013.01); *H02J 7/14* (2013.01)

(58) Field of Classification Search
USPC ........................................................ 187/290
See application file for complete search history.

(56) References Cited

U.S. PATENT DOCUMENTS

| | | | | |
|---|---|---|---|---|
| 6,460,658 | B2* | 10/2002 | Suga .................... | B66B 1/30 |
| | | | | 187/290 |
| 8,230,978 | B2* | 7/2012 | Agirman ............... | B66B 5/027 |
| | | | | 187/290 |
| 10,144,615 | B2* | 12/2018 | Prakash ................ | B66B 1/30 |
| 10,155,640 | B2* | 12/2018 | Gewinner ............. | B66B 5/027 |
| 2011/0144810 | A1* | 6/2011 | Wesson ................ | B66B 5/027 |
| | | | | 700/275 |
| 2018/0229968 | A1* | 8/2018 | Cheng .................. | B66B 1/32 |

(Continued)

FOREIGN PATENT DOCUMENTS

| | | |
|---|---|---|
| JP | 2004/043078 A | 2/2004 |
| JP | 2013/184773 A | 9/2013 |

(Continued)

OTHER PUBLICATIONS

International Search Report PCT/ISA/210 for International Application No. PCT/FI2015/050767 dated Feb. 18, 2016.

(Continued)

*Primary Examiner* — Jeffrey Donels
(74) *Attorney, Agent, or Firm* — Harness, Dickey & Pierce, P.L.C.

(57) ABSTRACT

The invention relates to an elevator system comprising: an elevator car; at least one motor operable in two modes wherein in the first mode the at least one motor is consuming electrical energy and in the second mode the at least on motor is generating electrical energy; at least one rechargeable battery coupled to the at least one motor; wherein the at least one rechargeable battery is configured to be charged with an energy generated by the at least one motor when the motor is in the second mode.

6 Claims, 5 Drawing Sheets

(56) References Cited

U.S. PATENT DOCUMENTS

2018/0251338 A1*  9/2018  Ratia .................. H02J 7/14
2019/0062111 A1*  2/2019  Agirman ............. B66B 5/027
2020/0172374 A1*  6/2020  Hall .................. B66B 5/0037

FOREIGN PATENT DOCUMENTS

WO  WO-2007/077288 A1  7/2007
WO  WO-2010/027346 A1  3/2010

OTHER PUBLICATIONS

Written Opinion of the International Searching Authority PCT/ISA/237 for International Application No. PCT/FI2015/050767 dated Feb. 18, 2016.

International Preliminary Report on Patentability PCT/FI2015/050767 dated Dec. 11, 2017.

* cited by examiner

ELEVATOR ENERGY SOLUTION

This application is a continuation of PCT International Application No. PCT/FI2015/050767 which has an International filing date of Nov. 6, 2015, the entire contents of which are incorporated herein by reference.

TECHNICAL FIELD

The invention relates generally to a technical field of energy provision solutions in a context of elevators. More particularly, the invention relates to maintenance of energy for elevator cars in special situations.

BACKGROUND

The operation of elevator systems is based on a provision of electrical power to electrical motors that are configured to generate mechanical energy in order to move elevator cars in their hoist ways. Every now and then it happens the provision of electrical power is interrupted for one reason or other and this causes halting of the elevator system. Typically, the failure in the provision of electrical power to the elevator system originates either from a failure in electrical transmission system or from an emergency situation, such as a fire, in the building where the elevators reside.

In order to guarantee the provision of electrical power to elevators in every situation several solutions are developed. First one is that high power generators are implemented in the buildings, which generators are configured to generate power in power failure situations. The drawbacks in such solutions are that the high-power generators are very expensive, but also need room from the buildings with necessary safety solutions.

Another solution for maintaining the provision of electrical power to elevators is that so called emergency batteries are arranged for elevators. In normal operational conditions the batteries are charged, but in case of power failure from the normal source, the charges of the batteries are used for driving the elevator car(s) in so called evacuation zone floors in order to release passengers from the cars and/or in order to evacuate people from the building to the evacuation zone floors. The drawback in the use of batteries in the above described way is that as they have a limited charging capacity the charge may run out too early especially in the evacuation situation and all persons cannot necessarily be evacuated in a safe way.

Some prior art documents introduce solutions for generating electrical energy with a hoisting machine of an elevator, wherein the generated energy may be stored in an energy storage system. Also, in some prior art documents a consideration is given on decision-making when a certain elevator trip shall be initiated. A charging level of a battery providing energy to the elevator system may be taken into account in the decision-making. Examples of prior art documents relating to these aspects are JP2013184773 A and WO 2007/077288 A1.

Hence, there is need to mitigate at least partly the above described drawbacks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided an elevator system. The elevator system according to the invention comprises:
- an elevator car,
- at least one motor operable in two modes wherein in the first mode the at least one motor is consuming electrical energy and in the second mode the at least one motor is generating electrical energy,
- at least one rechargeable battery coupled to the at least one motor,
- wherein the at least one rechargeable battery is configured to be charged with an energy generated by the at least one motor when the motor is in the second mode.

The elevator system may further comprise a control unit for at least controlling of the use of the at least one rechargeable battery. The control unit may be configured to obtain information on a charging level of the at least one battery from at least a measurement device coupled to the rechargeable battery.

The control unit may further be configured to receive an indication on a trip to be executed; determine a required electrical energy needed for executing the trip as indicated; and compare the required electrical energy of the trip to an electrical energy obtainable from the at least one rechargeable battery wherein the electrical energy obtainable from the at least rechargeable battery is dependent on the charging level of the at least one rechargeable battery. The determination of the required electrical energy needed for executing the trip as indicated may be configured to be performed by the control unit with at least one of the following: obtaining a required energy of the trip to be executed with maximum weight of the elevator car with the load from a memory; estimating the total weight of the elevator car with the load based on data obtained from at least one sensor wherein the at least one sensor is configured to measure a parameter by means of which an estimation of the total weight is derivable and deriving the required electrical energy based on the estimation of the total weight of the elevator car.

In response to the detection that the comparison indicates that the electrical energy obtainable from the rechargeable battery exceeds the required electrical energy of the trip, the control unit may also be configured to authorize at least one of the following: the elevator car to execute the trip requested if the comparison indicates that the battery provides enough energy to the trip, output of at least part of the electrical energy from the rechargeable battery. The at least part of the electrical energy from the rechargeable battery may be output to at least one of the following: a braking resistance, a rechargeable battery of at least one other elevator car, a rechargeable battery external to an elevator car. The elevator system may comprise an interface for transferring electrical energy from the at least one rechargeable battery to at least one of the following: the braking resistance, the rechargeable battery of at least one other elevator car, the rechargeable battery external to an elevator car, wherein the interface is operating via at least one of the following: galvanic contact, inductive coupling.

Alternatively or in addition, in response to the detection that the comparison indicates that the electrical energy obtainable from the rechargeable battery is below the required electrical energy of the trip, the control unit may be configured to prevent the execution of the trip requested and initiate charging of the rechargeable battery.

Moreover, the control unit may be configured to control at least the transfer of electrical energy to and from the rechargeable battery by controlling a switch arranged between at least the rechargeable battery and the at least one motor.

The at least motor may be a permanent magnet synchronous motor.

The at least one rechargeable battery may also be configured to be charged with an energy generated by the at least one motor when the motor is in the second mode in one of the following situations: external power supply is cut-off, external power supply is limited.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
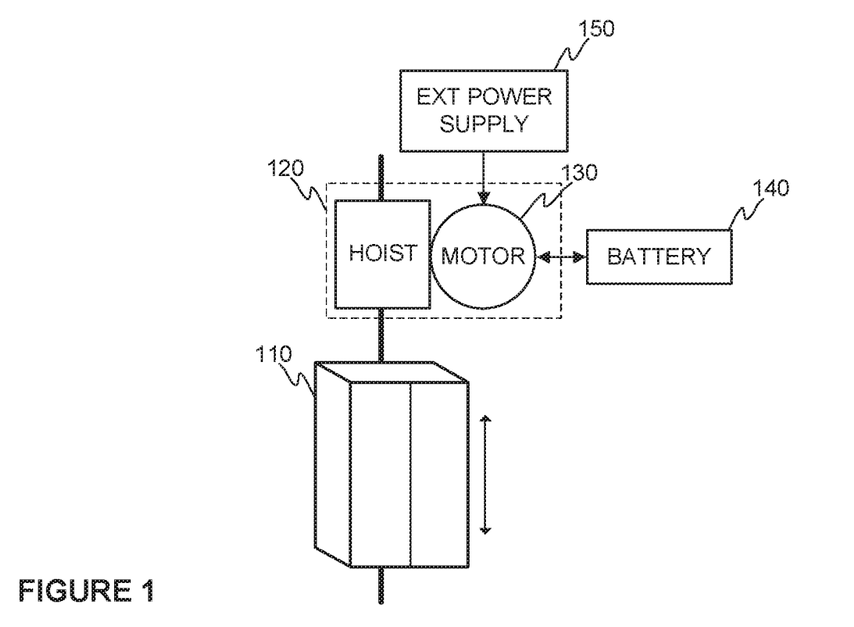
FIG. 1 shows a schematic illustration of an elevator system according to an embodiment of the invention.

FIG. 1 schematically illustrates an example of the present invention. The elevator system comprises at least one elevator car 110, at least one motor 130 operating as a part of hoist machine 120 and at least one rechargeable battery 140. The at least one elevator car 110 may be configured to travel in a pathway, such as in a shaft. The motion to the elevator car 110 may be achieved by generating a mechanical energy with the at least one motor 130. In case of rope based elevator system the motor 130 is configured to provide necessary force to the rope e.g. through a traction sheave in order to cause the elevator car 110 to travel in one direction or another. In non-rope based elevator systems the hoist machine 120 may e.g. comprise a gearwheel adjusted to a gear track, or rail. By providing a rotational force to the gearwheel with the motor(s) 130 the elevator car 110 may be arranged to travel in its pathway. Now according to the present invention the motor(s) 130 used in this context are such that they have two different operating modes. A first mode is such that in order to perform its task the motor(s) 130 requires external energy from an external power supply 150, such as from an electric power network, i.e. consumes electrical energy in order to generate mechanical energy for the hoist machine. In other words the motor(s) is configured to overcome gravitational force of the elevator system in order to drive the elevator car to a desired direction. A second mode of the motor(s) 130 is that the motor(s) 130 may generate electrical energy as a result of driving the elevator car 110 into such direction that at least part of the change in potential energy of the elevator car 110 may be turned to electrical energy by means of the motor(s) 130 in use in the elevator system. Typically, the motor(s) when generating electrical energy is driven in such a state that it is braking the travel of the elevator car 110 in its pathway. According to the present invention the generated electrical energy may be directed to a rechargeable battery 140 in order to store the energy for any further need, such as to be used in power failure situation when no external power is available for operating the elevator system. Alternatively or in addition, the charging of the rechargeable battery 140 with an electrical energy generated by the at least one motor 130 may be made dependent on at least one of the following: a charge status of the battery, a status of the external power supply.

As said above the motor according to the present invention is such that it is capable to generate electrical energy from a mechanical energy causing the motor elements to rotate with respect to each other. The mechanical energy results from a change of potential energy of the elevator system, as will be described. Some non-limiting examples of applicable motor(s) are any type of permanent magnet synchronous motor, such as a linear motor that may operate as generators.

Figures 2A, 2B:
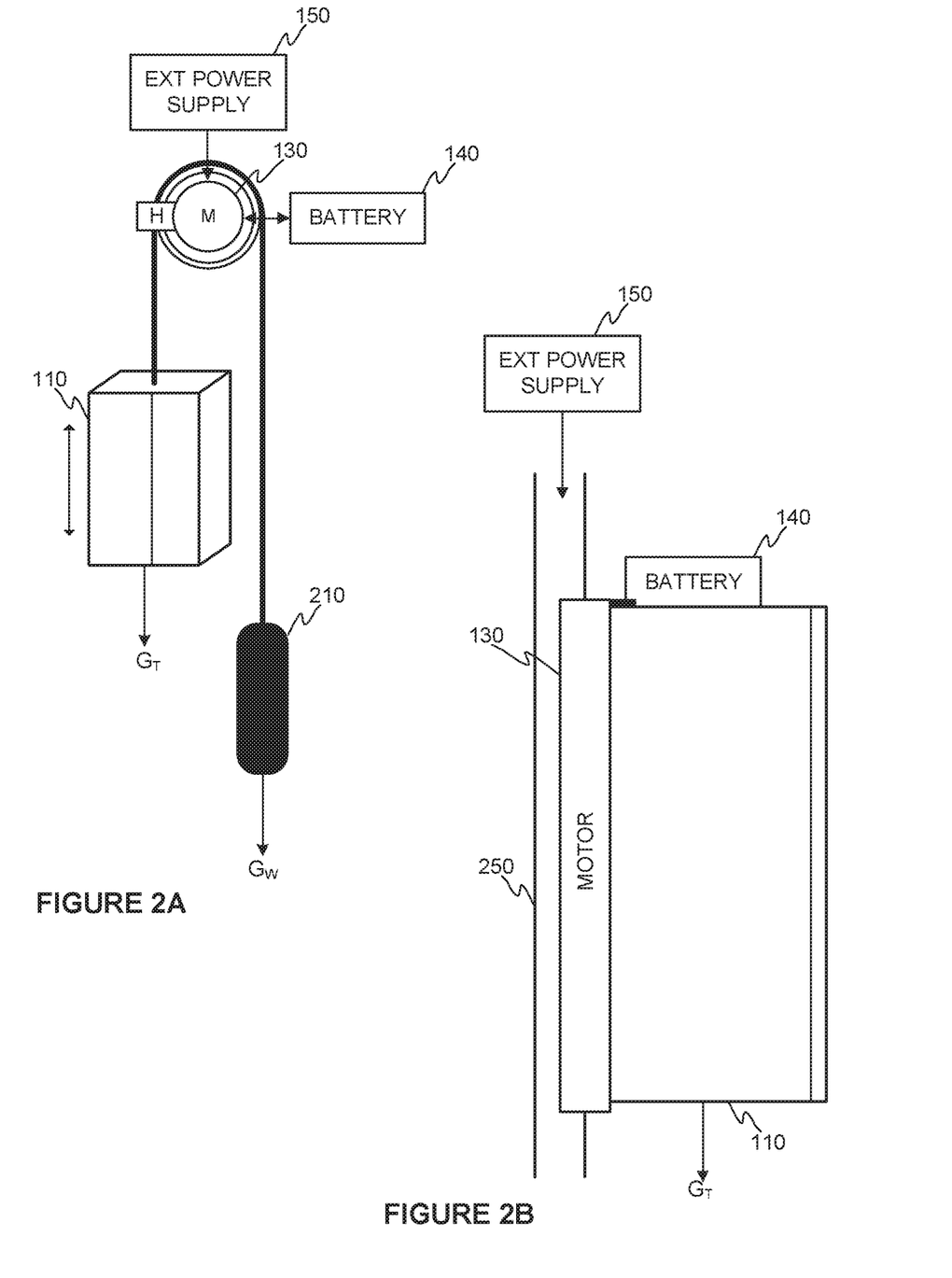
FIGS. 2A and 2B show schematic illustrations of elevator systems according to further embodiments of the invention.

Next the invention is described though some different types of elevator systems in order to describe the inventive aspects of the present invention in more detail. FIG. 2A schematically illustrates an embodiment wherein the elevator system is based on so called counter-weight solution. In such an implementation a counter-weight 210 is optimally selected to the elevator car 110 so that power needed from the motor 130 for causing the elevator car 110 to move in its pathway is optimized. The elevator car 110 and the counter-weight 210 may be coupled together with a rope, a chain or a belt, or similar. In the solution according to the invention as illustrated in FIG. 2A the rechargeable battery 140 is charged under the following conditions:

if $G_T > G_W$, the battery is charged when the elevator car travels downwards, and if $G_T < G_W$, the battery is charged when the elevator car travels upwards, wherein $G_T$ refers to gravitational force affecting to the total weight of the elevator car comprising both the weight of the elevator car itself but also any load in the elevator car and coupled to it, and $G_W$ refers to gravitational force affecting to the weight of the counter-weight 210. One shall understand that the total weight $G_T$ may also comprise at least partial weight of the rope or similar being on the side of the elevator car if it is not compensated e.g. with a so called compensating rope arranged in either the elevator car, counter weight or both. In both of the mentioned situations (under the listed conditions) the at least one motor 130 is not generating power for moving the elevator car, but the motor(s) is operating as a braking device i.e. a generator from which electrical energy may be obtained for storing it to the rechargeable battery 140. As may be seen from FIG. 2A the motor(s) 130 and advantageously also the rechargeable battery 140 reside on top of the elevator car pathway, i.e. shaft. Alternatively, they may reside at the bottom of the pathway.

FIG. 2B, in turn, schematically discloses an implementation of the invention wherein no counter-weights are used. Especially, the solution according to FIG. 2B illustrates an implementation in which a linear motor, or at least part of it, is mounted to the elevator car 110 and which linear motor 130 is arranged to travel along a rail 250 into which coils belonging to the linear motor 130 are mounted. By providing power to the coils the linear motor may be operated. Now, in case the elevator car is traveling downwards in its pathway there is no need to generate power by the motor 130 and the motor, or motors, may be changed to a generator in order to generate electrical energy. The generated electrical energy may be stored in the rechargeable battery 140. Naturally, this is possible if the battery 140 is not fully charged. In the example of FIG. 2B the rechargeable battery 140 is mounted, e.g. removable, in the elevator car 110 and, hence, travels along the car.

Figure 3:
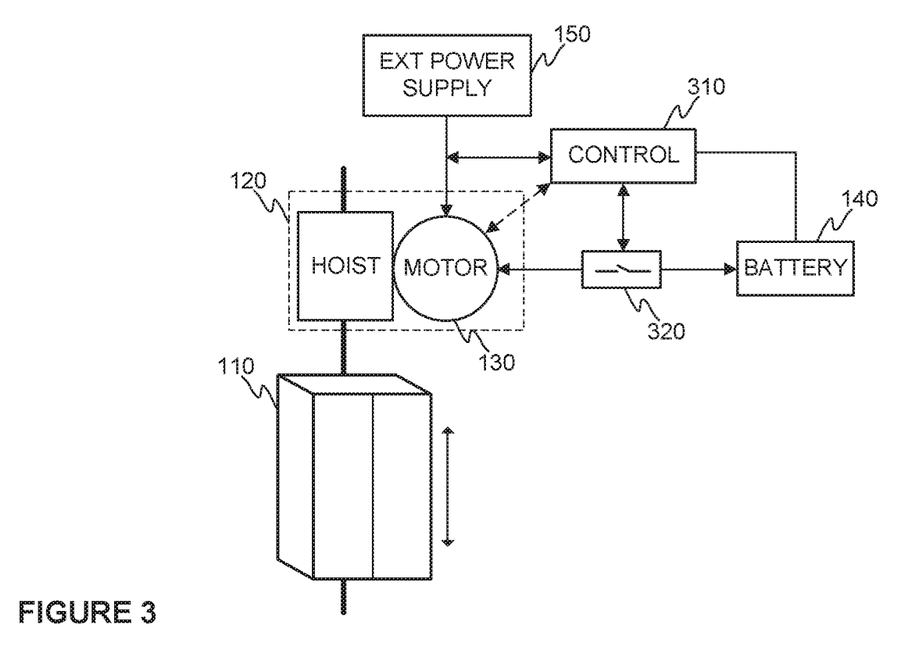
FIG. 3 shows a schematic illustration of a still further embodiment of the invention.

In the following the invention is described in a context of emergency situation, or any situation, in which the external power supply is cut-off or at least limited so that the external power supply cannot supply enough power for operating the elevator system, and extra power is needed. As already described in a normal operational situation the elevator system receives the electrical energy, i.e. electric current, from an external power supply network. FIG. 3 illustrates schematically an arrangement according to the invention by means of which it is possible to detect the cut-off situation of the external power supply 150 and to control a utilization of the rechargeable battery 140. According to the solution a control unit 310 is arranged to monitor a status of the external power supply and in response to a detection of a cut-off situation in the external power supply to control a switch 320 to enable access to the rechargeable battery 140. The control unit 310 may be configured to measure a voltage level, or any other similar parameter, of the external power supply line, which information is analyzed in the control unit 310 and if the analysis indicates that the external power supply does not provide electrical energy for driving the motor, and/or the elevator system, the control unit 310 may be configured to establish and deliver a control signal to the switch 320. The control signal may e.g. cause the switch 320 to change its state so that the motor 130 may utilize the electrical energy stored in the rechargeable battery 140 and/or provide electrical energy for charging the battery 140. The mode is dependent on an operational state of the motor 130, as described above. The operational state of the motor 130 may also be detected by the control unit 310 in order to detect if the motor 130 needs electrical energy for operating or if the motor 130 generates electrical energy (this is indicated with dash line arrow between the control unit 310 and the motor 130 in FIG. 3). The detection of the mode may e.g. be arranged by monitoring a specific port in the motor and/or mounting one or more sensors in the motor, on in any other entity, in order to detect the mode of the motor by obtaining information from the one or more sensors. In some implementation the switch 320 may be controlled according to operational mode of the motor 130 in order to select a correct port in the motor for inputting or outputting electrical energy from/to the rechargeable battery according to the mode of the motor 130.

Next it is assumed that the elevator car is intended to be driven to such a direction that requires electrical energy and the external power supply is cut-off. The control unit, whose operation may e.g. be secured with a power input from the rechargeable battery 140, may be configured to control the switch 320 so that the electrical energy stored in the battery may be input to the motor 130 in order to provide power to cause the elevator car 110 to travel in the intended direction. For example, the elevator car 110 may start its travel from one floor in a building and in the emergency situation the elevator car 110 may be requested to travel to an emergency floor, for example. When the elevator car e.g. returns to the floor from which it started its travel, the motor of the elevator car 110 may generate electrical energy, e.g. through braking, and the control unit 310 may be configured to detect this e.g. in the manner as described above and to instruct the switch to set to such a mode that the generated electrical energy may be directed and stored in the rechargeable battery 140. In a cut-off situation the operation as described enables a longer operation of the elevator system, which, in turn, enables rescuing people from the building even in a power supply cut-off situation (e.g. fire).

Even if above the invention is mainly described in a context that external power supply is cut-off, it does not limit the invention anyhow. In other words, the present invention may be applied in any situation in which the external power supply is not able to provide enough power for operating the elevator system, and/or driving one or more elevator cars, as expected. In such a situation the utilization of the rechargeable battery may be implemented either alone or together with an external power supply being in a limited state as described.

Figure 4:
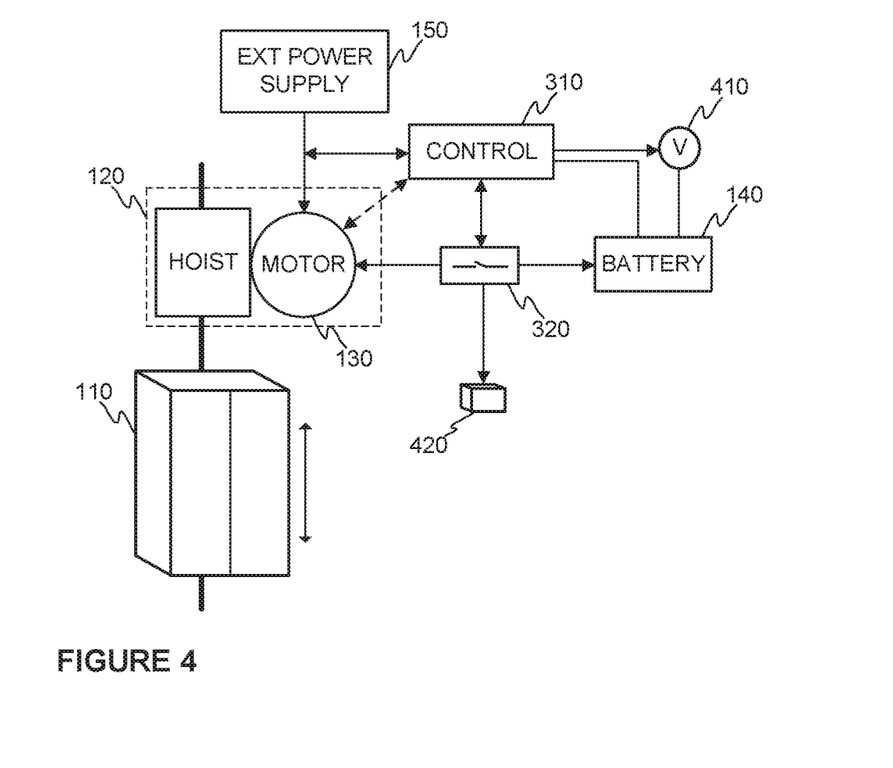
FIG. 4 shows a schematic illustration of a still further embodiment of the invention.

In some implementation of the invention, as schematically illustrated in FIG. 4, it is established an arrangement by means of which it is at least partly prevent the elevator system, and especially the motor and/or the rechargeable battery, to break down. Namely, it may happen that the rechargeable battery is, or becomes, fully charged, but the at least one motor 130 continues to generate electrical energy. The excessive electrical energy originating from the at least one motor is advantageously directed to some other entity. For example, the rechargeable battery 140 may be equipped with a voltage and/or current meter 140, or any similar measurement device, in order to provide information on a charging state of the battery 140. The control unit 310 may be configured to obtain measurement information from the voltage and/or current meter 140 and to analyze the information. For example, the control unit 310 may store information on the maximum charging capacity of the battery 140 and compare the information obtained from the voltage and/or current meter 410 to the maximum charging capacity. If the comparison indicates that the charging level of the battery has reached a predetermined limit, e.g. 95% of the maximum capacity, the control unit 310 may be configured to control a switch 320 so that the electrical energy generated by the at least one motor 130 is directed to a braking resistance 420 that is configured to convert the electrical energy (brought to it in the form of electric current) to heat. The braking resistance 420 may be elevator car specific and traveling along the car. Naturally, in case the motor, the battery and/or any other entity as described does not travel along the elevator car, but resides e.g. in an engine room, one or more braking resistances may be installed therein and the excessive electrical energy is directed there.

Figure 5:
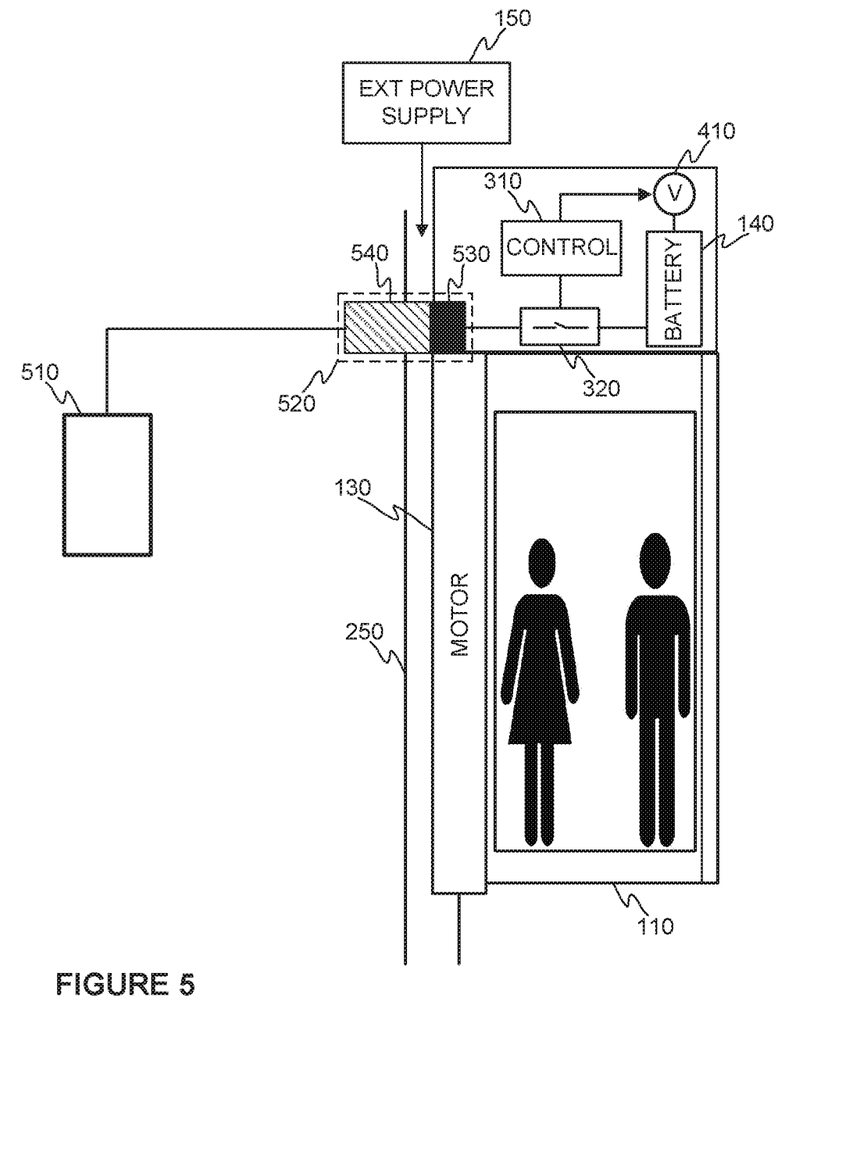
FIG. 5 shows a schematic illustration of a still further embodiment of the invention.

According to some further implementation of the invention at least part of the electrical energy stored in the rechargeable battery 140 may be output to a dedicated entity in at least one predetermined floor when the elevator car 110 arrives there. An example of such an implementation is schematically illustrated in FIG. 5. The implementation in FIG. 5 is shown in a context wherein the motor and the other entities as referred already in the context of the previous embodiments of the invention are carried together with the elevator car 110. FIG. 5 does not necessarily depict all couplings between the entities e.g. compared to FIG. 4. In the embodiment of FIG. 5 the control unit 310 may be configured to detect that the elevator car 110 has entered a specific floor, wherein electrical energy of the battery 140 may be output. The detection may e.g. be based on information obtained from one or more sensors arranged in the elevator system or on a communication of the control unit, either directly or indirectly, and another entity which communication carries information indicating floor information either directly or indirectly. In response to detection that elevator car 110 resides in such a floor that it is possible to output electrical energy from the battery 140 to an external entity 510 the control unit may give a control signal to the switch 320 for directing at least part of the electrical energy stored in the batter to an external entity 510. The switch 320 may change its state so that a current path is established between the battery 140 and the external entity. The current path may be established over an interface 520 between an elevator car device 530 elevator car and a floor device 540. The mentioned devices 530, 540 may be plug-and-socket type arrangement wherein the mentioned devices get plugged with each other when the elevator car enters the floor in question. The devices 530, 540 may e.g. comprise contact shoes configured to establish a galvanic contact automatically when they are brought together. Alternatively or in addition, the interface 520 may be implemented with an inductive coupling by arranging one or more coils in the elevator car device 530 and the floor device 540 that are operatively coupled to each other and thus capable of transferring electrical energy from one coil to another in the known manner. Such an implementation may require that the DC current originating from the battery 140 is converted to AC prior to inputting it to the one or more coils in the elevator car device 530. The conversion may e.g. be implemented with an inverter that may be arranged in the current path, e.g. in the context of the switch 320. The inverter may also obtain its operating current from the battery 140. The external entity 510 may e.g. comprise one or more resistances for transforming the electrical energy to heat or one or more further rechargeable batteries that may store at least part of the electrical energy originating from the at least one battery 140 used for storing the generated electrical energy by the motor 130. According to some embodiment the control unit 310 may be configured to give the control signal to the switch 320 under a predetermined condition, such as the voltage level of the battery exceeds a predetermined level wherein the voltage level in the battery 140 may be obtained from a measurement device, such as a voltage and/or current meter 410, coupled to the battery 140. If the external entity 510 is an battery, it may also be arranged that in case the charging level of the battery 140 is below a predetermined level, the stored electrical energy in the external entity may be transferred to the rechargeable battery 140 when the elevator car resides on such a floor that it may access the external entity 510.

A further aspect relating to the above-described implementation is that the control unit 310 may be configured to monitor energy level in the battery 140 in a sense that there remains enough electrical energy in order to perform a travel, or a trip as indicated. In other words the control unit may receive an indication on a trip to be executed by the elevator car 110. The indication may e.g. originate from user input given through a control panel residing e.g. on a floor or a dedicated trip may be defined in a memory accessible by the control unit. The dedicated trip may e.g. be a predefined evacuation trip between two, or more, floors that the elevator car is instructed to travel in an emergency situation. The control unit 310 may be configured to determine a required electrical energy needed from the rechargeable battery 140 for performing the indicated trip to be executed. The determination may be based on stored data in a memory accessible by the control unit 310 wherein the stored data defines required electrical energy for each possible trip. Advantageously, the stored data takes into account a possible weight, such as maximum weight, of the elevator car with the load. Now, the control unit 310 may, by obtaining information on the charging level of the battery 140, compare if the at least one battery 140 comprises enough energy to execute the indicated trip. This may be performed by comparing the required energy of the trip to an energy obtainable from the at least one battery. In case the battery 140 comprises electrical energy more than needed to perform the trip, the control unit 310 may authorize the elevator car to execute the trip as indicated. Alternatively or in addition, the control unit 310 may authorize output of at least part of the electrical energy stored in the battery 140 to the external entity 510 prior to executing the trip. Moreover, in some implementation the control unit 310 may be configured to define the amount of energy that is allowed to output to the external entity 510, and to monitor the outputting. When the defined amount of electrical energy is output the control unit 310 may be configured to cancel the output of electrical energy to the external entity 510 e.g. by giving a control signal to the switch 320.

A further embodiment of the invention may be that for determining if the rechargeable battery 140 comprises, i.e. stores, enough energy for a trip to be executed an estimation of a total weight of the elevator car with load may be determined in order to determine more closely if there is enough energy in the battery for the trip to be executed. Advantageously the total weight is estimated e.g. when a door of the elevator car is closed, as then the total load is in the elevator car. The determination of the weight may be determined with one or more sensors that may provide necessary data for estimating the total weight. According to an embodiment of the invention the at least one sensor may be the curtain of light which generates data for the control unit 310. The control unit may be configured to determine, on the basis of obtained data from the curtain of light, how many passengers has entered and exited to and from the elevator car. Based on this the control unit may e.g. use an average weight of human being for determining an estimation of the weight of the load in the elevator car. By summing that with a known weight of the elevator car one may generate an estimation of the total weight of the elevator car prior to the trip executed. As the energy required for the trip is dependent on the total weight of the elevator car the control unit 310 may determine if the rechargeable battery comprises enough energy for the trip with the load in the elevator car. If there is no enough energy, the elevator system needs to charge the battery for a predetermined period of time from the external sources as described if this is possible for the elevator system. In response to a detection that the charging of the battery meets the required energy level for executing the trip the control unit 310 may allow the trip to be executed. It is also possible to implement an arrangement that informs the passengers on the waiting time, i.e. charging time. Alternatively or in addition, the one or more sensors may comprise sensors which directly give estimation on the total weight of the elevator car. Such sensors may e.g. be fixed with rope of the elevator car and the sensors may generate data representing a tension of the rope, or similar, at each time of measurement. As the tension is dependent on the total weight of the elevator car the control unit 310 may be configured to determine the total weight and, thus, the necessary energy to move the elevator car with the load over the trip to be executed. Another way to determine the total weight of the elevator car may e.g. be such that the floor of the elevator is arranged as floating. When passengers, or any other load, enter in the elevator car the force of the load affecting the floating floor is measured with an applicable number of power sensors. Hence, the weight of the passengers may be determined and adding this to the known weight of the elevator car, comprising the weight of the mechanics among any other entities, the total weight may be determined. The determination of the required energy needed for executing the trip may e.g. be based on a determination a difference of the potential energies between the end points of the trip to be executed. Then, by determining how much electrical energy the electrical motor needs to overcome the difference of the potential energy it is possible to determine if the rechargeable battery may provide the required electrical energy.

Figure 6:
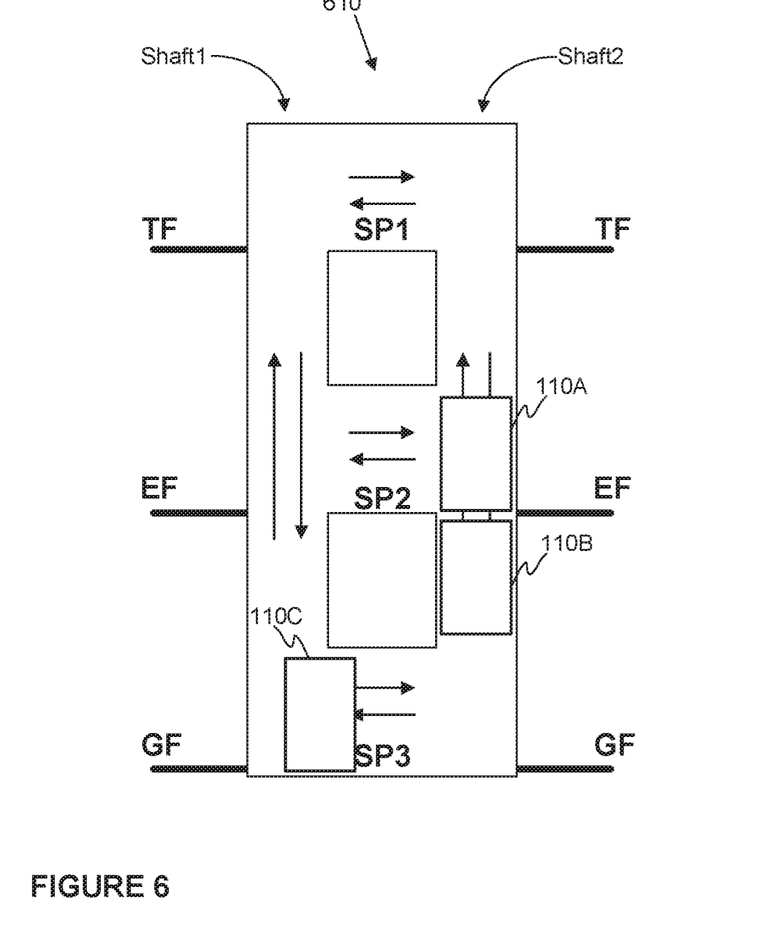
FIG. 6 shows a schematic illustration of an application environment of the present invention.

Some embodiments of the invention relate to so called multi-car environment in that multiple cars may travel in the same shaft. An example of such an environment is schematically illustrated in FIG. 6 wherein two shafts (Shaft1, Shaft2) are arranged in a building 610. In the non-limiting example according to FIG. 6 three floors are illustrated in both shafts. The floors are ground floor GF, evacuation floor EF and top floor TF. In the example the elevator cars 110A, 1106 and 110C are driven in an emergency situation in that people from the ground floor GF and the top floor TF are carried to the evacuation floor EF. The elevator cars 110A-110C may travel both upwards and downwards in each shaft. Additionally, the elevator cars 110A-110C may transfer between the shafts through transfer paths SP1, SP2, SP3. For example, the elevator car 110C is transferring from the shaft 2 to the shaft 1 in FIG. 6. The elevator cars may be equipped with rechargeable batteries and control units as well as any other entities as described in the context of the previous embodiments of the invention. In this non-limiting example the motors in the elevator cars 110A-110C are linear motors and the elevator system is non-counter weight solution. Hence, when an elevator car 110A-110C is caused to travel downwards, the linear motor operates as a generator from which the electrical energy may be input to the battery to be charged. Correspondingly, when the elevator car 110A-110C is instructed to travel upwards, the elevator car in question consumes electrical energy stored in the battery. More specifically, the motor uses the electrical energy to generate a mechanical force causing the elevator car to travel along the shaft. An applicable hoist solution is used herein. In an emergency situation, wherein an external power supply is cut-off, the motor operates in said two modes and the electrical energy is either input or output to/from the battery. Moreover, the elevator system, such as schematically illustrated in FIG. 6, may be arranged to carry people from the ground floor GR and from the top floor TF to the evacuation floor EF. This means that an elevator car traveling from top floor to the evacuation floor is storing electrical energy in the battery. Correspondingly, the elevator car that is traveling from the ground floor to the evacuation floor consumes electrical energy from the battery. According to an embodiment of the invention at least two cars may be arranged to meet e.g. at the evacuation floor e.g. so that first elevator car is unloading people to the evacuation floor wherein at least one other elevator is waiting for its turn to enter the evacuation floor after the first elevator car (see e.g. elevator cars 110A and 1106 in FIG. 6). According to the embodiment of the invention the elevator cars 110A-110C may be equipped with electrical energy transfer interfaces, such as contact shoes, by means of which it is possible to transfer electrical energy from one elevator car to another. In the described situation the elevator car 110A that has charged its battery when traveling downwards may be able to provide at least part of the charge to the elevator car 1106 that has consumed the electrical energy from its battery in upward motion. In some other embodiment in the multi-car environment the building may be equipped with such a wiring and electrical energy transfer interfaces, e.g. such as described in the context of FIG. 5 that the elevator cars 110A-110C may reside in different floors, but still inputting and outputting the electrical energy to/from the batteries is possible between two or more elevator cars. The non-limiting examples in the multi-car environment enable longer operation of the elevator cars in emergency and evacuation situations. The solutions in multi-car environment may also comprise optimization of the energy transfer between the batteries of the elevator cars and/or external entities by utilizing information on the charging levels of the batteries as described in the context of other embodiments.

In the description above it is referred to switch 320 that is a controllable device in order to direct the electrical energy between the different entities as described. The description does not limit the switch 320 to one physical switch device only, but rather refers to a switching unit comprising necessary number of switches by means of the operation as described may be achieved. Moreover, the switch 320 may comprise its own computing unit, such as a processor that may be configured to derive necessary information from a control signal and on the basis of that to control necessary number of switches.

The control unit as described in a context of several embodiments is advantageously a device that comprises one or more processors and one or more memories storing portions of computer program code and/or parameters that may be executed and used by the processor. The execution of at least some portions of the computer program code may cause the control unit to operate as described above. Further, the control unit may be provided with necessary communication devices and interfaces in order to communicate with the entities as described.

One aim of the invention is to enable a storing and use of electrical energy in a rechargeable battery. Advantageously, the battery is selected so that has an optimal capacity in the application area. For example, the capacity of the battery may be selected so that it may store enough energy in order to run the elevator car a necessary distance with the stored electrical energy when the battery is charged at the maximum level. For example, the necessary distance may be to run the elevator from a bottom floor to top floor when the motor consumes the electrical energy in that direction. The capacity of the battery is an important parameter especially as it comes to evacuation situations.

As said the above described embodiments and the figures are non-limiting examples of the invention. For example, the elements that are carried together with the elevator car may depend on a selected motor and a selected elevator solution (e.g. counter weight–non-counter weight).

The specific examples provided in the description given above should not be construed as limiting the applicability and/or the interpretation of the appended claims. Lists and groups of examples provided in the description given above are not exhaustive unless otherwise explicitly stated.

What is claimed is:

1. A multi-car elevator system adapted to perform an evacuation trip comprising:
   an elevator car,
   at least one motor operable in two modes wherein in the first mode the at least one motor is consuming electrical energy and in the second mode the at least one motor is generating electrical energy,
   at least one rechargeable battery coupled to the at least one motor and to a measurement device, wherein the at least one rechargeable battery is configured to be charged with an energy generated by the at least one motor when the motor is in the second mode,
   a control unit for at least controlling of the use of the at least one rechargeable battery wherein the control unit is configured to obtain information on a charging level of the at least one battery from at least the measurement device coupled to the rechargeable battery and wherein the control unit is further configured to:
   receive an indication on the evacuation trip to be executed,
   determine a required electrical energy needed for executing the evacuation trip as indicated,
   compare the required electrical energy of the evacuation trip to an electrical energy obtainable from the at least one rechargeable battery wherein the electrical energy obtainable from the at least rechargeable battery is dependent on the charging level of the at least one rechargeable battery, and
   in response to the detection that the comparison indicates that the electrical energy obtainable from the rechargeable battery exceeds the required electrical energy of the evacuation trip, the control unit is configured to authorize at least one of the following: the elevator car to execute the evacuation trip requested if the comparison indicates that the battery provides enough energy to the evacuation trip, output of at least part of the electrical energy from the rechargeable battery, wherein the at least part of the electrical energy from the rechargeable battery is output to at least one of the following: a braking resistance, a rechargeable battery of at least one other elevator car, a rechargeable battery external to an elevator car; and
   in response to the detection that the comparison indicates that the electrical energy obtainable from the rechargeable battery is below the required electrical energy of the evacuation trip, the control unit is configured to prevent the execution of the evacuation trip requested and to initiate charging of the rechargeable battery.

2. The elevator system of claim 1, wherein the determination of the required electrical energy needed for executing the evacuation trip as indicated is configured to be performed by the control unit with at least one of the following: obtaining a required energy of the evacuation trip to be executed with maximum weight of the elevator car with the load from a memory; estimating the total weight of the elevator car with the load based on data obtained from at least one sensor wherein the at least one sensor is configured to measure a parameter by means of which an estimation of the total weight is derivable and deriving the required electrical energy based on the estimation of the total weight of the elevator car.

3. The elevator system of claim 1, wherein the elevator system comprises an interface for transferring electrical energy from the at least one rechargeable battery to at least one of the following: the braking resistance, the rechargeable battery of at least one other elevator car, the rechargeable battery external to an elevator car, wherein the interface is operating via at least one of the following: galvanic contact, inductive coupling.

4. The elevator system of claim 1, wherein the control unit is configured to control at least the transfer of electrical energy to and from the rechargeable battery by controlling a switch arranged between at least the rechargeable battery and the at least one motor.

5. The elevator system of claim 1, wherein the at least motor is a permanent magnet synchronous motor.

6. The elevator system of claim 1, wherein the at least one rechargeable battery is configured to be charged with an energy generated by the at least one motor when the motor is in the second mode in one of the following situations: external power supply is cut-off, external power supply is limited.

\* \* \* \* \*